March 28, 1967

W. L. RENDESSY 3,311,390

TRAILER HITCH APPARATUS

Filed June 28, 1965

INVENTOR.
WILLIAM L. RENDESSY.
BY
Willard S. Graue
ATTORNEY.

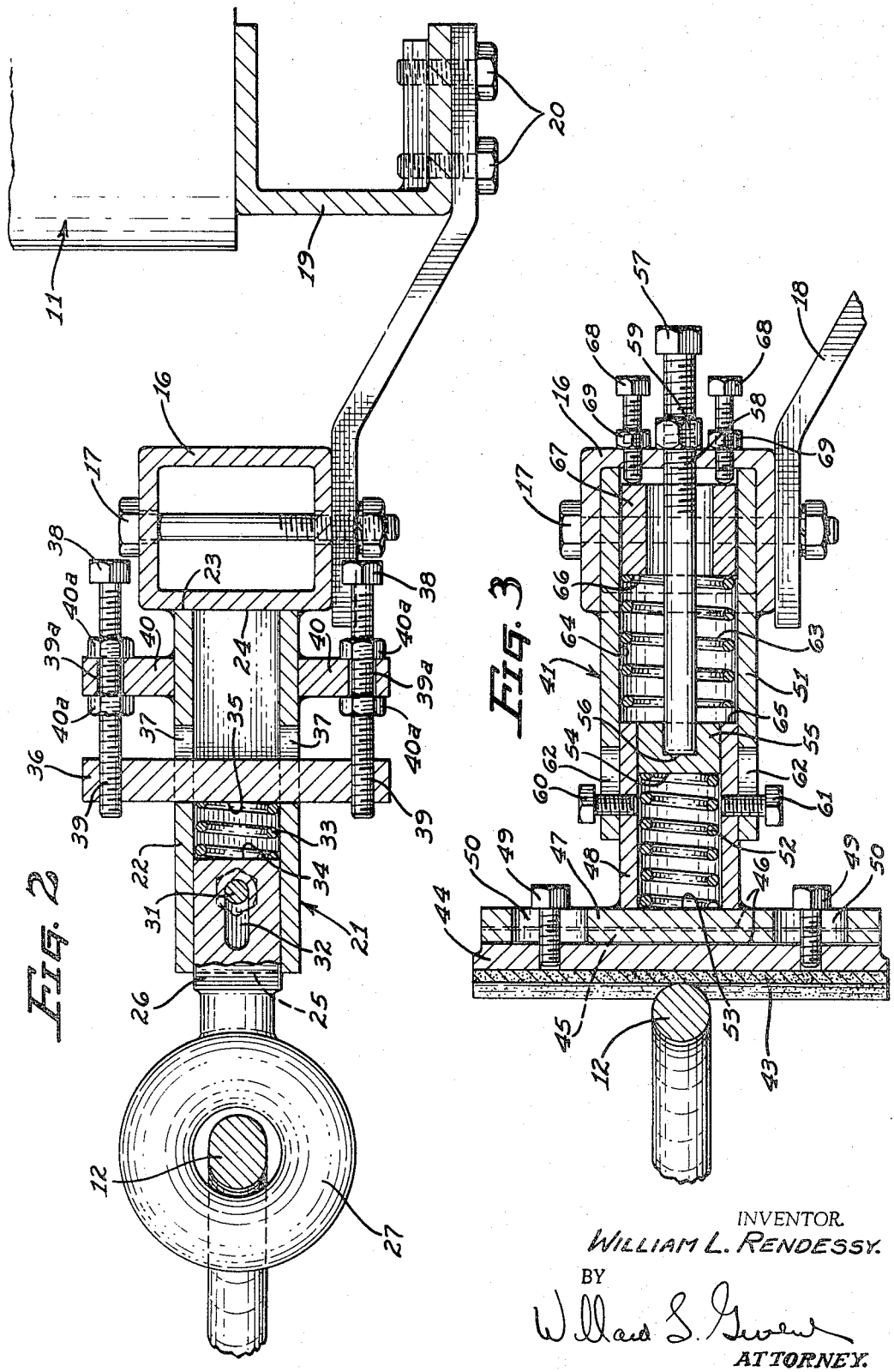

United States Patent Office 3,311,390
Patented Mar. 28, 1967

3,311,390
TRAILER HITCH APPARATUS
William L. Rendessy, Phoenix, Ariz., assignor of fifteen percent to Phoenix Electronics Components, Inc., Phoenix, Ariz., a corporation of Arizona
Filed June 28, 1965, Ser. No. 467,667
2 Claims. (Cl. 280—504)

This invention pertains to trailer hitch apparatus and is particularly directed to an improved trailer hitch and pivot control apparatus related thereto.

One of the objects of this invention is to provide a trailer hitch which prevents side sway and jack-knifing between the trailer and towing vehicle.

Another object is to provide a trailer hitch having a more stable and rigid pivotal connection between the towing vehicle and the trailer.

It is also an object to provide a trailer hitch having a specially constructed pivot and braking mechanism which provides uniform restraint for any angle of relative pivoting of the trailer and towing vehicle.

Still another object of this invention is to provide an improved trailer hitch which is better and safer to maneuver when backing and parking the vehicle and trailer hitched thereto.

Further features and advantages of this invention will appear from a detailed description of the drawings in which:

FIG. 2 is an enlarged sectional view of the towing ring mechanism on the line 2—2 of FIG. 1.

FIG. 3 is an enlarged sectional view of the braking mechanism on the line 3—3 of FIG. 1.

Figure 1:
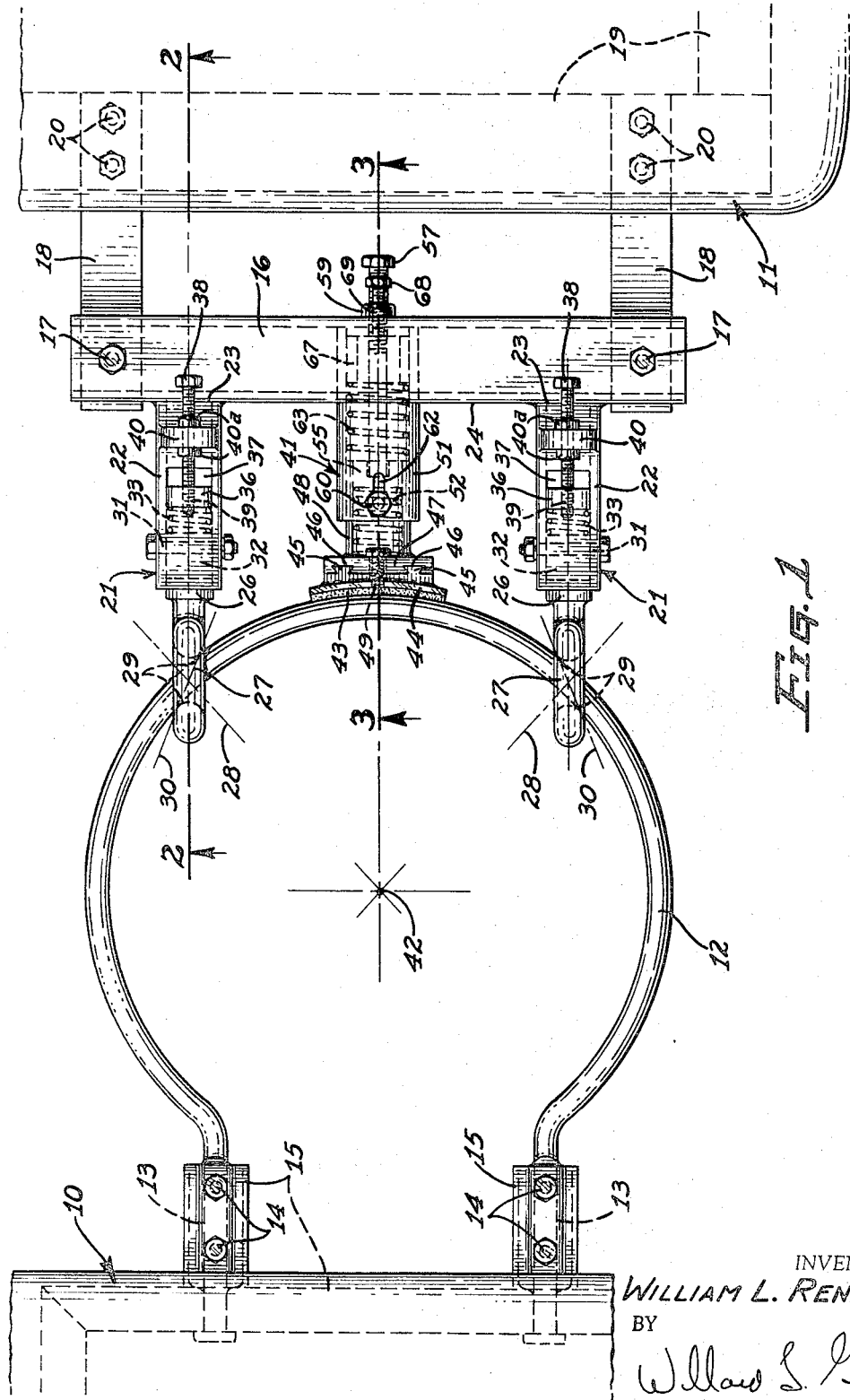
FIG. 1 is a plan view of a trailer hitch incorporating the features of this invention.

As an example of one embodiment of this invention, there is shown a trailer hitch for interconnecting a trailer 10 and a towing vehicle 11 comprising an enlarged annular towing ring 12 having its rear portions 13 fixed by suitable bolts 14 to the frame portions 15 of the trailer 10.

A mounting bar 16 is fixed by demountable bolts 17 to suitable laterally spaced brackets 18 fixed to the towing vehicle frame 19 by suitable bolts 20. A pair of laterally spaced towing ring receiving members 21 each comprises a rearwardly extending square tubular support 22 rigidly fixed at its forward end 23 to the outer portions of the rear face 24 of the mounting bar 16. Longitudinally slidable in the rear end square bore 25 of the tubular support 22 is the shank 26 formed integral with the towing ring 12 and engaging eyelet guide 27, which slidingly engages at 29 around the towing ring 12 in an angularly disposed plane 30 relative to a radial plane 28 of towing ring 12.

A stop pin 31 is fixed in the square tubular support 22 and extends through the elongated slot 32 formed in the shank 26 of the eyelet guide 27 to limit forward and rearward relative movement of the eyelet guide and the support 22. A compression spring 33 has one end abutting against the front end 34 of the shank 26 while the other end of the spring 33 is engaged by the surface 35 of the tension adjusting yoke 36 extending diametrically in the elongated slots 37 formed in the support 22. Adjusting screws 38 are threadedly fixed at 39 in the tension adjusting yoke 36 and extend through clearance holes $39_a$ formed in lugs 40 rigidly fixed to the tubular support 22. Adjusting nuts $40_a$ are threadedly mounted on the screws 38 each side of the lugs 40 for regulating the pressure being applied by the spring 33 against the shank 26 opposing the relative forward movement of the trailer toward the towing vehicle when brakes are applied and slowing down of the towing vehicle occurs.

A braking device 41 is provided to restrain the relatively free pivotal movement of the towing ring and eyelet guides 27 around the trailer-towing vehicle pivot axis 42 comprising an arcuate segmental brake shoe 43 arranged to slidingly engage the periphery of the towing ring 12 which is carried on a mounting plate 44 having dovetails 45 mounted for vertical movement in mating dovetail guideways 46 formed in the support plate 47 rigidly fixed to the guide sleeve 48. Limit screws 49 fixed in the mounting plate 44 and projecting through the limiting slots 50 in the support plate 47 restrict the extent of vertical relative movement of the brake shoe 43 and the towing ring 12.

The guide sleeve 48 is slidably mounted in the main support sleeve 51, in turn fixed to the mounting bar 16 intermediate the towing ring eyelet guides 27. A friction compression spring 52 is presented within the guide sleeve 48 between the back surface 53 of the support plate 47 and the abutment surface 54 of an adjustable pressure plate 55 mounted on the inner end 56 of an adjusting screw 57 adjustably threadedly mounted at 58 in the mounting bar 16 and locked in adjusted positions by the lock nut 59. Travel limiting screws 60 and 61 carried on the guide sleeve 48 and contained within elongated slots 62 formed in the main support sleeve 51 serve to positively limit relative travel of the brake shoe 43 and the mounting bar 16.

A brake compression spring 63 is contained within the bore 64 of the main support sleeve 51 and is arranged to engage between the inner end surface 65 of the guide sleeve 48 and the abutment surface 66 of the adjustable collar 67 in the bore 64 and positioned in adjusted relation by suitable set screws 68 and lock nuts 69 carried on the mounting bar 16.

During normal driving on level terrain the spring 52 alone provides the required frictional pressure of the brake shoe 43 on the towing ring 12. In order to lessen excessive pressure of the brake shoe 43 against the towing ring 12 when going down hill or coming to a stop, the guide sleeve 48 and brake shoe 43 are additionally supported by the yielding brake spring 63 which assists the normal friction spring 52.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A trailer hitch apparatus for pivotally interconnecting a trailer frame and a towing vehicle frame comprising in combination:
   (A) a towing ring fixed to said trailer frame,
   (B) a pair of laterally spaced eyelet guides mounted on said towing vehicle frame pivotally receiving said towing ring,
   (C) a friction brake including a brake shoe located between said spaced eyelet guides and mounted on said vehicle frame to engage said towing ring to restrain and damp the relative pivotal movements between said towing ring and said eyelet guides.

2. A trailer hitch apparatus for pivotally interconnecting a trailer frame and a towing vehicle frame comprising in combination:

(A) a towing ring fixed to said trailer frame, (B) a pair of laterally spaced eyelet guides mounted on said towing vehicle frame pivotally receiving said towing ring, (C) a friction brake including a brake shoe located between said spaced eyelet guides and mounted on said vehicle frame to engage said towing ring to restrain and damp the relative pivotal movements between said towing ring and said eyelet guides, (D) said friction brake including means to automatically vary its frictional effect in response to road and driving conditions.

References Cited by the Examiner

UNITED STATES PATENTS 1,234,788  7/1917  Milner _____ 280—492

FOREIGN PATENTS 1,118,387  6/1956  France.
581,635  9/1958  Italy.

MILTON BUCHLER, Primary Examiner.

BENJAMIN HERSH, Examiner.

C. C. PARSONS, Assistant Examiner.